Jan. 25, 1966  J. HENRY-BAUDOT  3,231,774
A.C. ROTATING ELECTRIC MACHINES WITH PRINTED
CIRCUIT ARMATURES
Original Filed Oct. 21, 1957  2 Sheets-Sheet 1

INVENTOR
JACQUES HENRY-BAUDOT
BY Lemon, Palmer,
Stewart & Estabrook
ATTORNEYS

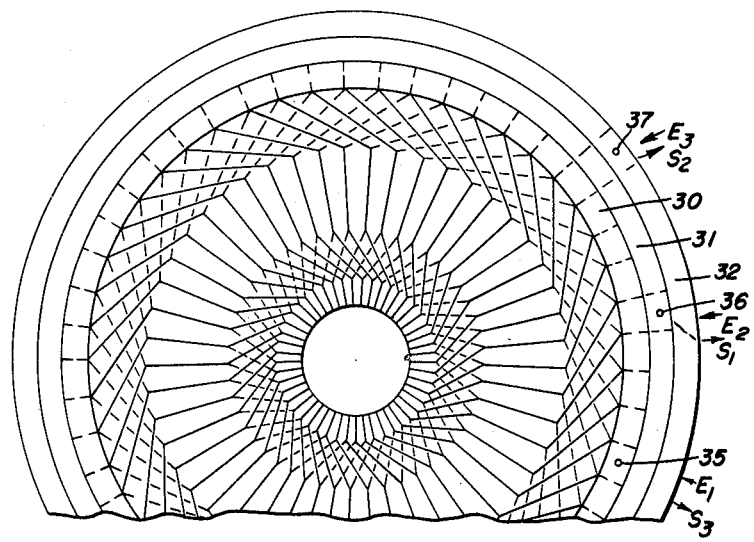
Fig. 7.
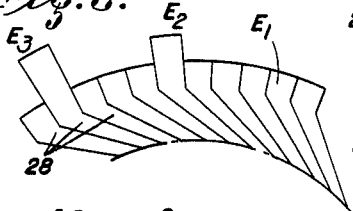
Fig. 8.
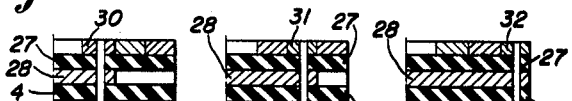
Fig. 9a. Fig. 9b. Fig. 9c.
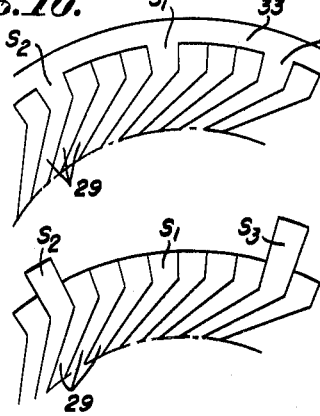
Fig. 10.
Fig. 11a. Fig. 11b. Fig. 11c.
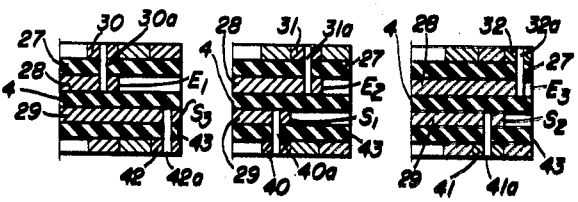
Fig. 13a. Fig. 13b. Fig. 13c.
Fig. 12.
INVENTOR
JACQUES HENRY BAUDOT

United States Patent Office 3,231,774
Patented Jan. 25, 1966

3,231,774
A.C. ROTATING ELECTRIC MACHINES WITH PRINTED CIRCUIT ARMATURES
Jacques Henry-Baudot, Antony, France, assignor to Printed Motors Inc., New York, N.Y.
Filed Apr. 15, 1960, Ser. No. 22,508
Claims priority, application France, May 4, 1959, 794,030
9 Claims. (Cl. 310—268)

The present application is a continuation-in-part of my copending application Serial No. 1,128 filed January 7, 1960 (as a division of Serial No. 691,434 filed October 21, 1957), see Patent No. 3,144,574 dated August 11, 1964.

The present invention relates to A.C. rotating electric machines of the kind wherein the rotor armature is provided with a winding made in accordance to the so-called "printed circuit" techniques. Such windings for direct-current machines have been fully disclosed in my co-pending application identified above.

In my co-pending application, I have described an electrical winding structure comprising a winding carrier of sheet-like form, at least a portion of said carrier in the form of an endless band having opposite faces thereof formed of insulating material and presenting an endless winding surface on each face of the carrier, and a conductive winding mounted on said carrier comprising a first set of conductors intimately secured to one face of said carrier and arranged transversely of the winding band thereof and spaced apart along the length of said band, a second set of conductors intimately secured to the opposite face of said carrier and arranged transversely of the winding band thereof and spaced apart along the length of said band, and bridging connections extending from the two ends of each conductor on one face of said carrier to the ends of two different conductors on the opposite face of said carrier, said two conductors being spaced apart along the length of said winding band by more than one conductor spacing, and said bridging connections connecting the conductors of both sets in series circuit relation in at least one closed circuit in which alternate conductors therein are located on opposite faces of said support.

Such a winding armature, as described in my said co-pending application, is made part of D.C. rotating machines or low (audio) frequency generating machines, wherein at least one pair of brushes are supported by the stator structure of the machine and have direct sliding engagement with the one and/or the other of said sets of half-turn conductors on the armature.

It is the object of the invention to devise a rotor structure for A.C. rotating machines derived from the above-described D.C. winding armature.

According to the invention, at least one pair of conductive coating rings (collector rings) is formed on the winding carrier together with the half-turn sets of conductors and said rings are provided with connections to certain of said conductors, the brushes in the machine being in direct contact with said rings.

According to a further feature of the invention, at least one of said rings is formed on the same carrier sheet-like member which carries the conductors of the winding.

According to a further feature of the invention, and specially adapted for multi-phase winding machines, one or more of the rings are formed on separate insulating sheet-like carrier applied over part of the winding conductors through the intermediary of said further sheet-like carrier, and connections made therethrough to conductors of said winding.

These and further features will be fully described with reference to the accompanying drawings, wherein:

FIG. 7 shows a front view of a three-phase armature according to the invention;

FIG. 8 shows part of said front view with the omission of the collector rings shown in FIG. 7;

FIGS. 9a, 9b and 9c show partial cross-sections embodying a first method of making the armature of FIGS. 7 and 8;

FIG. 10 shows a partial rear view of the armature of FIG. 7;

FIGS. 11a, 11b and 11c show partial cross-sections illustrating, together with FIG. 10, an alternative method of making the armature of FIGS. 7 and 8;

FIG. 12 shows the rear face of the armature of FIG. 7 in a construction like that of FIGS. 13a to 13c; and FIGS. 13a, 13b and 13c show partial cross-sections illustrating, together with FIG. 12, a further alternative method of making an armature according to FIGS. 7 and 8.

Other multiphased armatures will be directly deducible from these embodiments.

Figure 1:
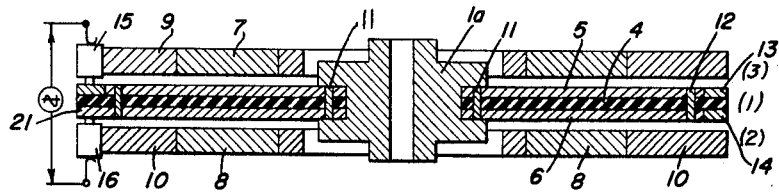
FIG. 1 shows a cross-section of an illustrative embodiment of a machine according to the invention.

A rotating electric machine of the kind concerned in the present invention is shown, FIG. 1, by a rotor disk-like armature 1 inserted between two disc-shaped stator members 2 and 3. The mechanical details are not shown as being unnecessary for the disclosure. The rotor disc is made of a thin insulating carrier sheet 4 over the faces of which are formed the half-turn conductor sets 5 and 6 interconnected at their inner ends by face-to-face connections 11 and interconnected at their outer ends by face-to-face connections 12. Said sheet carrier 4 further carries two collector rings formed as conductive coating rings 13 and 14 on opposite faces of the carrier. Said rings are shown as respectively surrounding the conductors, but they might as well, except for purely matters of facility, be formed at the inner periphery of the conductor sets. The rotor is carried by a hub 1a so as to rotate between two stator members one of which at least, and for instance 2 in the example, is a multipolar inductor. Two of the permanent magnetic poles of the stator inductor 2 are indicated at 8 supported by a non-magnetic base member 10 which also supports a brush 16 in contact with the ring 14. The other stator member 3 for instance comprises a magnetic yoke ring 7 supported by a non-magnetic base plate 9 which also supports a brush 15 in contact with the ring 13 of the armature. Across the brushes is applied the alternating current potential difference for the operation of the machine. An advantage of placing the brushes in registration or alignment on opposite sides of the rotor disc is to effect balancing of the pressures of the brushes on the disc, and this is not related at all with any electrical condition.

Figure 2:
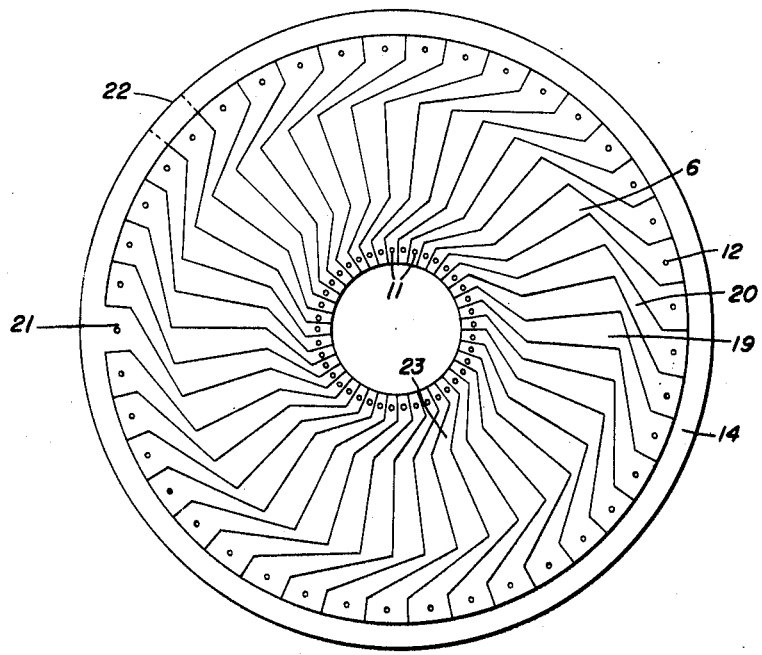
FIG. 2 shows a front or face view of the winding armature in said machine.

The winding is illustratively shown as being of the series-wave kind having 41 turns and connected for an eight-pole machine. Its pattern is directly understood from FIG. 2. FIG. 2 shows one face of the rotor armature, with the drawing convention that the solid lines indicate the separations or gaps between conductors (as is the case in FIGS. 4, 6, 7, 8, 10 and 12). Such a drawing convention actually corresponds to the design of the "print" impressed on the resist during the usual photo-etching operation of formation of such flat and bare conductor patterns.

Each half-turn conductor comprises, for the sake of illustration, a substantially radial and sectoral portion 19 extended at both ends by slanted portions 20 and 23, respectively, such slanted portions serving the same function as the end connections for a conventional winding. Such portions end in small radial portions through and from which are made the face-to-face connections 11 and 12 by the well-known hole-metallisation process. At two places, electrically spaced by 180°, the periphery of the half-turn conductor is directly extended to the conductive "collector" rings 13 and 14, each on a respective face of the armature member. Such a direct connection is shown at 21 in FIGS. 1 and 2 for the front face, and is indicated by a dotted line section 22 in FIG. 2 for the rear face of the member.

Figure 3:
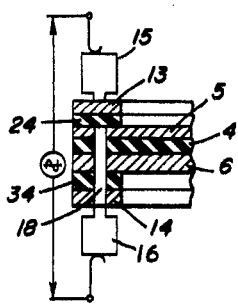
FIG. 3 shows a partial cross-section and FIG. 4, a partial front view, of an alternative embodiment of said armature.
Figure 4:
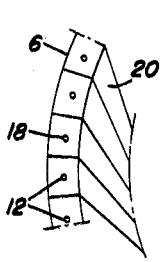

When a reduced diameter of the member is considered as advisable, both rings 13 and 14 may be formed on the outer faces of two insulating thin rings 24 and 34, FIGS. 3 and 4, applied to cover the outer terminal portions of the half-turn conductors or to cover any other circular path or band of the winding surfaces. In such an arrangement, connections spaced apart by 180 electrical degrees are made between the rings 13 and 14 and certain conductors of the winding. For example, the connection 18 in FIGURE 3 connects the ring 14 with a conductor in each of the conductor sets 5 and 6.

Figures 5, 6:
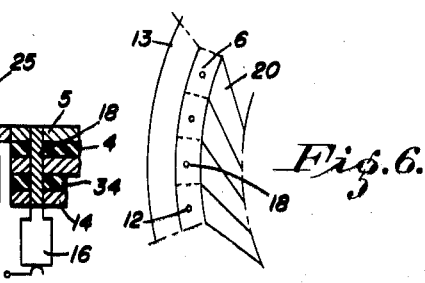
FIG. 5 shows a partial cross-section, and FIG. 6, a partial front view, of a further alternative embodiment of said armature—said FIGS. 1 to 5 illustrating a single-phase machine.

It is also quite feasible, FIGS. 5 and 6, to form one face of the printed circuit winding with the concentric collector ring 13 and to apply over the other face of the winding a separately formed collector ring 14 carried on insulating ring 34. This results in a radial displacement between the collector rings. The ring 13 located beyond the periphery of the insulating carrier is pressed between a brush 15 and a guiding member 25. Both brushes 15 and 16 are then provided on the same side of the rotor in the machine.

In at least the alternative of FIGS. 3–4, the interconnections may be completed around the edges of the insulating carriers instead of passing through them for the connection of the rings and the winding conductors.

Obviously, the machine may operate as a motor, when current is supplied to the winding, or as a generator, when the rotor is mechanically driven.

For extension of the above-described arrangements to multi-phase machines, the illustrative case of three-phase machines will now be considered. Several methods of transposition may be useful according to the various circuit connections of the three phases. The basic arrangement is shown in FIGS. 7 and 8 and the alternative arrangements for varying the phase-to-phase connections are shown from FIGS. 9 to 13c. As an illustrative example, the winding presents 49 turns, is of the series-wave type, and is for an eight pole machine.

The rotor winding is formed of two sets of conductors 28 and 29 applied to opposite faces of carrier disc 4.

To the conductors of FIG. 7, in each of the three cases to be described, are associated three concentric collector rings 30, 31 and 32 which may be formed on a common insulating ring 27 applied on the front face conductors 28 as apparent from the cross-sections of FIGS. 9a to 9c, 11a to 11c and 13a to 13c.

Under these collector rings three terminals are provided in the winding as shown in the partial front view of FIG. 8. These terminals are referred to as $E_1$, $E_2$ and $E_3$. Said terminals are extensions of half-turn conductors 28 or 29 which are separated by 120 electrical degrees from each one to the next other one in the winding.

The stator will carry three brushes instead of two, on the side of the winding rotor which carries rings 30, 31 and 32.

The first electrical interconnection of three phases may be a delta (or polygonal) arrangement as known. Such an arrangement is illustrated in FIGS. 9a, 9b and 9c which show cross-sections at the locations of terminals $E_1$, $E_2$ and $E_3$. The rear face of the armature does not present any different arrangement of S terminals with respect to the E terminals of the front face; the electrical face-to-face connections are merely extended at such locations for also electrically connecting the rings 30, 31 and 32 to the conductors (28, front face, and 29, rear face). The locations of such interconnections on the rings 30, 31 and 32 are shown at 35, 36 and 37 on FIG. 7 and on FIGS. 9a to 9c.

A further and well known interconnection arrangement of the phases comprises three separate input and a common output point, viz. a star connected arrangement. For such a case, the rear face of the winding member is provided as shown in FIG. 10 with a single collector ring 33 surrounding the half winding on this face. Said collector ring 33 is connected to three conductors 29 spaced apart by 120 electrical degrees by direct connections $S_1$, $S_2$ and $S_3$ (facing or registering with the conductors 28 of the front face to which are made the connections $E_1$, $E_2$ and $E_3$). FIGS. 11a, 11b and 11c show the respective partial cross-section views at the locations of connections between conductors 28 and rings 30 to 32. A single brush will be provided in the complete machine structure in contact with ring 33.

The third contemplated arrangement of the armature does not pre-suppose any particular kind of interconnection of phases but enables the user to establish whatever type of interconnection he wants to obtain. For such a purpose, the rear face of the armature winding is provided, as shown in FIG. 12, with the three terminals $S_1$, $S_2$ and $S_3$ separately made and corresponding to the terminals $E_1$, $E_2$ and $E_3$ of the front face. Three further collector rings 40, 41 and 42 are associated with said rear face through an insulating layer 43 as shown in FIGS. 13a, 13b and 13c, the interconnections being obvious from said figures. As shown, rings 30, 31 and 32 are connected to terminal portions $E_1$, $E_2$ and $E_3$ by interconnections 30a, 31a and 32a, respectively, and rings 40, 41 and 42 are connected to terminal portions $S_1$, $S_2$ and $S_3$ by interconnections 40a, 41a and 42a, respectively. In the complete machine three pairs of brushes are consequently provided for the six collector rings so that the user may be able to electrically interconnect such pairs of brushes at his own desires.

What is claimed is:

1. A multi-polar rotating electric machine of the axial air-gap type, comprising a rotor formed of a disc-shaped carrier member having a winding thereon consisting of two annular arrays of flat and bare conductors insulated from each other and having their broad faces intimately bonded throughout their lengths to opposite faces of an annular portion of said carrier member, the conductors of each array extending generally radially of said rotor and being uniformly distributed over said annular portion of said carrier member, each conductor forming a half-turn of the winding, the ends of said conductors being connected from one array to the other one in a closed-circuit annular winding in which successive conductors are located in different arrays, at least two collector rings also formed of flat bare conductor coatings intimately adhering to an insulating surface carrier rotating with said rotor, connections between said collector rings and said closed-circuit annular winding at points spaced angularly about the axis of said winding, and a stator member having brushes mounted thereon and engaging said collector rings.

2. An electric rotating machine according to claim 1, wherein at least one of said collector rings is formed over the same insulating face carrier as are the winding conductors, and said connections between said collector rings and said winding comprise conductive coating formed integrally with said rings and said conductors.

3. An electric rotating machine according to claim 1, wherein at least one of said collector rings is formed over a separate insulating face carrier from the winding conductor carrier.

4. An electric rotating machine according to claim 3, wherein said collector rings are provided on one side only of the winding and said connections are made through both insulating carriers.

5. An electric rotating machine according to claim 3, wherein said winding comprises a multi-phase winding having input and output conductors for each phase, and wherein collector rings equal in number to the number of electrical phases are applied on one side of the winding and are connected to the respective phase input conductors, and on the other side of the winding is applied a single collector ring connected to all phase output conductors.

6. An electric rotating machine according to claim 5, wherein said single collector ring is made on the same insulating carrier as the winding.

7. An electric rotating machine according to claim 3, wherein said winding comprises a multi-phase winding having input and output conductors for each phase and wherein said collector rings comprise two sets of collector rings, comprising in each set as many rings as said sets of rings being phases, are applied over the one and the other faces of said winding and being connected respectively to the input phase conductors on the one face and to the phase output conductors on the other face.

8. An electric rotating machine according to claim 3, wherein said separate insulating face carrier is applied over parts of the winding conductors on one face of said carrier member, and at least one connection is made from said one collector ring through said separate carrier to a winding conductor part covered by said separate insulating carrier.

9. An electric rotating machine according to claim 3, wherein said separate insulating carrier is applied over terminal extensions of the winding conductors on one face of said carrier member, and at least one connection is made from said one collector ring through said separate insulating carrier to one of said conductor extensions.

References Cited by the Examiner
UNITED STATES PATENTS

| | | | |
|---|---|---|---|
| 2,847,589 | 8/1958 | Haydon | 310—268 X |
| 2,970,238 | 1/1961 | Swiggett | 310—268 |
| 3,054,011 | 9/1962 | Silverschotz et al. | 310—268 |

ORIS L. RADER, *Primary Examiner.*

MILTON O. HIRSHFIELD, *Examiner.*

UNITED STATES PATENT OFFICE
CERTIFICATE OF CORRECTION

Patent No. 3,231,774                      January 25, 1966

Jacques Henry-Baudot

It is hereby certified that error appears in the above numbered patent requiring correction and that the said Letters Patent should read as corrected below.

Column 5, line 27, and column 6, line 1, strike out "said sets of rings being phases, are" and insert instead -- are phases, said sets of rings being --.

Signed and sealed this 27th day of December 1966.

(SEAL)
Attest:

ERNEST W. SWIDER                           EDWARD J. BRENNER
Attesting Officer                              Commissioner of Patents